United States Patent [19]

Marcotte

[11] Patent Number: 4,473,467
[45] Date of Patent: Sep. 25, 1984

[54] GRAVITY FLOW SEPTIC TANK SYSTEM

[76] Inventor: Oliver J. Marcotte, 25000 W. 10 Mile Rd., Southfield, Mich. 48075

[21] Appl. No.: 466,613

[22] Filed: Feb. 15, 1983

[51] Int. Cl.³ .................... B01D 21/02; B01D 21/24
[52] U.S. Cl. .................................. 210/153; 210/322; 210/513; 210/525; 210/923
[58] Field of Search ................. 210/242.1, 923, 776, 210/800, 241, 322, 242.3, 538, 540, 513, 521, 522, 525, 153; 137/143, 590

[56] References Cited

U.S. PATENT DOCUMENTS

| | | | |
|---|---|---|---|
| 3,666,102 | 5/1972 | Blanchard | 210/525 |
| 4,100,073 | 7/1978 | Hopcroft | 210/532 S |
| 4,290,887 | 9/1981 | Brown et al. | 210/525 |

Primary Examiner—Frank Sever
Attorney, Agent, or Firm—Harness, Dickey & Pierce

[57] ABSTRACT

The invention provides a septic tank system of greatly improved effectiveness in maintaining optimum bacterial action for a maximum length of time by utilizing a plurality of serially-connected tanks with the water level in each successive tank being lower than that in the first tank so that gravity flow is established between the successive tanks. A unique transfer means is provided between each of the successive tanks comprising one or more horizontal pipes having their inlet ends closed, each horizontal pipe having a wide opening in the upper portion thereof at a level preferably above the centerline of the pipe in order to permit the removal of scum through said openings by entrainment and/or suction action of the fluid flowing through the transfer pipe, thereby permitting gases to freely escape through the scum from the effluent surface of each tank and preventing deleterious effects of trapped gases upon the biodegradation action normally produced in each successive septic tank. The system also optionally includes apparatus to accommodate installation in severe clay, high-water and limestone areas, and the like.

1 Claim, 6 Drawing Figures

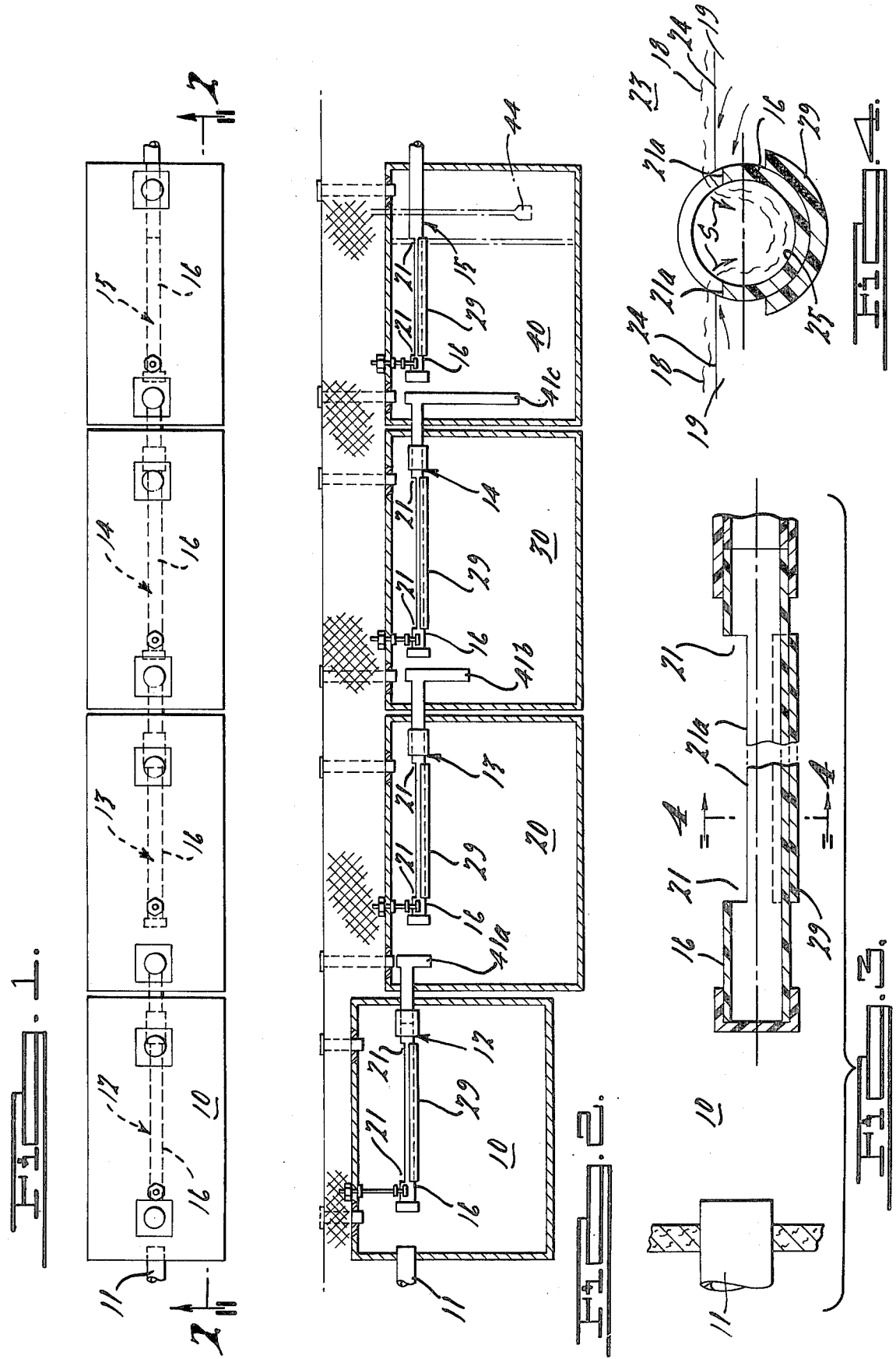

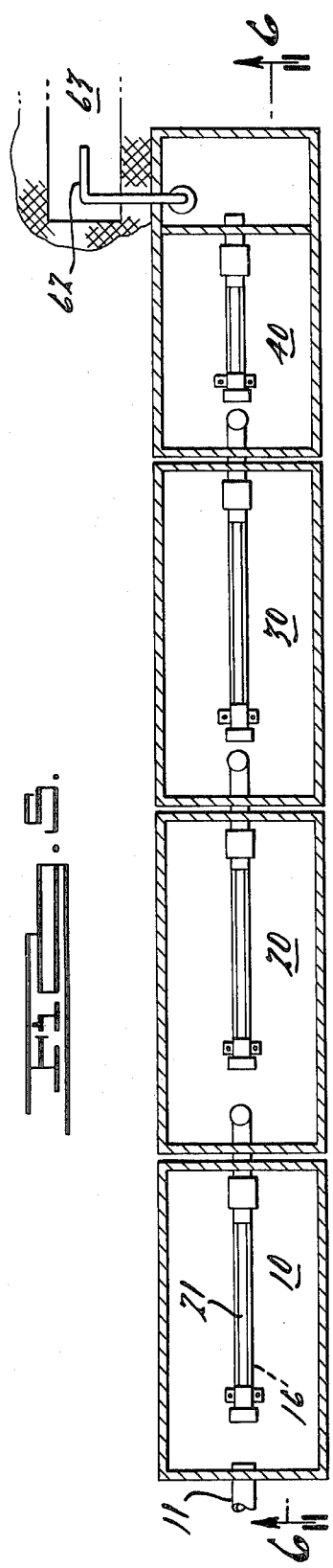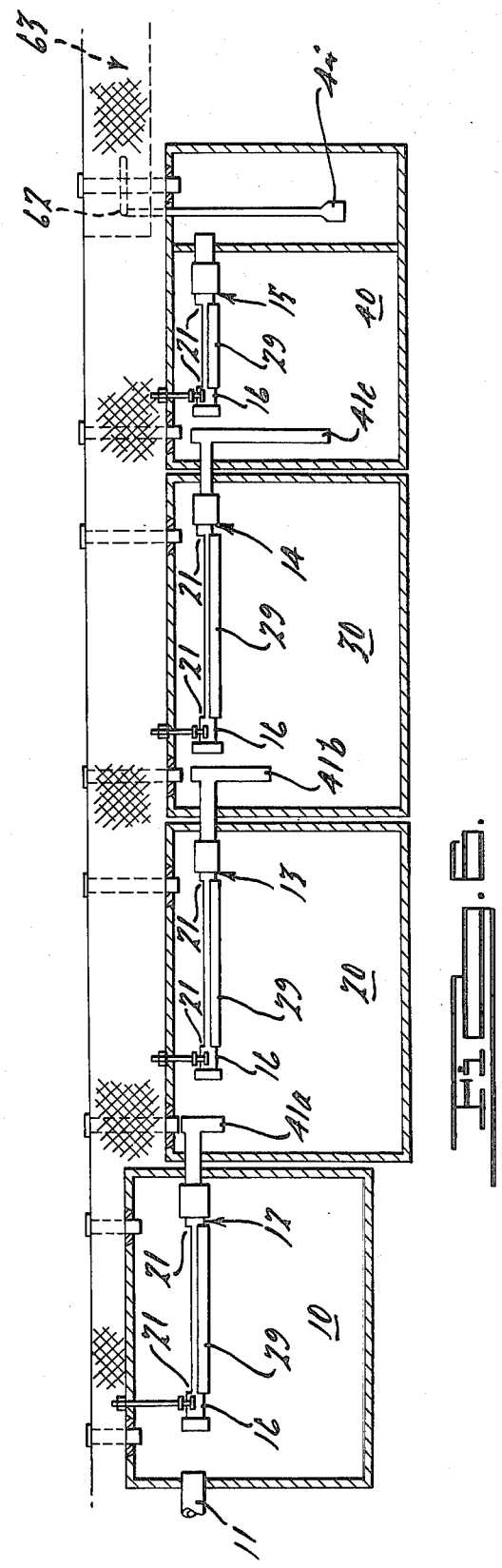

GRAVITY FLOW SEPTIC TANK SYSTEM

BACKGROUND AND SUMMARY OF THE INVENTION

Septic tanks have long been utilized as the primary means for residential sewage disposal in areas to which sewer lines have not been extended. A normal septic tank system employs only a single tank and the liquid effluent from such tank is drained through a leaching field. The primary function of the basic septic tank is to subject the solid materials in the sewage to biodegradation action of bacteria which normally develops in such tanks or which can be applied thereto. The bacteriological action normally converts the great majority of solid materials into relatively harmless soluble materials, gases and insoluble material. The insolubles remaining after the completion of the bacterial action collect in the bottom of the tank as a sludge which must be periodically removed.

The effectiveness of most septic tanks, however, is not limited by the accumulation of sludge but rather by the accumulation upon the top of the effluent of a scum or skin which comprises oily or fatty liquids and particles of untreated or partially treated solids surrounded by gases resulting in a flotation of such particles to the surface of the effluent. The existence of such scum or skin is highly deleterious to the effective action of the bacteriological degradation process in the septic tank because release of gas from the contents of the tank and the bacteriological action therein is greatly diminished.

The existence of a heavy scum or skin layer on the top of the effluent effectively prevents or at least hinders the generation of gases, which are primarily methane and carbon dioxide, by the anaerobic bacteria mainly in the sludge. The generated gases cannot escape and the high gas concentration adversely affects the bacteriological action. The result is that the tank scours, not because of the accumulation of sludge, but because the concentration of scum or skin on the surface of the tank fluid prevents effective bacteriological degradation. In severe situations, the discharge of the tank may have such a high concentration of untreated sewage as to cause spoilage of the leaching bed.

The adverse effects of scum on the surface of a sewage effluent has been well recognized in commercial and municipal sewage treatment systems to the extent that elaborate mechanical arrangements have been provided to move scrapers or buckets across the top of the effluent to remove the scum therefrom and discharge it exteriorly of the treatment tank or basin and separate from the normal effluent. Unfortunately, any type of mechanical system for removal of scum is far too expensive to be practical for typical home sewage systems; more importantly, the requirement for moving components necessarily means that constant maintenance would be required to keep the system in operable condition.

Typical mechanical systems of the type heretofore discussed may be found in U.S. Pat. No. 2,237,172 to Briggs, U.S. Pat. No. 2,337,859 to Stuller, U.S. Pat. No. 2,455,338 to Lind and U.S. Pat. No. 2,780,361 to Evans et al.

In Briggs U.S. Pat. No. 2,237,172, a sewage settling tank is provided with motor driven flights which skim scum from the sewage to the entry to an ascending chute across which a second set of motor driven flights extend to lift the scum over the lip of an open trough above the liquid level within the tank. The liquid is withdrawn through an effluent port spaced laterally from the trough, and at a level below the trough.

Stuller U.S. Pat. No. 2,337,859 discloses a tank with flights that extend through the liquid level surface defined by a weir in an outlet channel and are motor driven toward an auxiliary scum remover pipe spaced from the outlet channel. The scum remover has elongated wide-mouthed apertures in the pipewall which extend longitudinally of the pipe above the liquid surface level in one condition and can be lowered to and below that surface by rotation of the pipe around its longitudinal axis.

Lind U.S. Pat. No. 2,455,338 is similar to Stuller in general arrangement but has a float actuated scum remover pipe for driving the pipe in rotation by means of a limit switch, electric motor and gearing rather than the manual rotating means of Stuller.

Evans et al, U.S. Pat. No. 2,780,361 has a scum remover separate from the outlet port for effluent from a waste liquid treatment tank. A motor driven skimmer board is arranged to rotate about the central axis of a circular tank to carry the scum on the liquid surface to a scum-receiving pipe having a ported area parallel to its longitudinal axis. The port may be in the form of a continuous wide-mouthed slot and the pipe is arranged with adjusting means to raise or lower the port with respect to the liquid surface in the tank.

In addition to the elongate scum removers extending laterally over a substantial portion of treatment tanks, there have been removers of limited extent as shown in U.S. Pat. No. 1,188,159 to Dittrick, U.S. Pat. No. 2,439,633 to Reinhard, U.S. Pat. No. 2,717,873 to Montgomery et al, and U.S. Pat. No. 3,433,258 to Steele.

Dittrick U.S. Pat. No. 1,188,159 and Reinhart U.S. Pat. No. 2,717,873 each show a self-cleaning sanitary cistern including an exit at a lower portion and a funnel at the liquid surface to drain material from the upper surface as a skimmer. The funnel is of limited lateral extent and would not collect scum across a broad area of the liquid surface.

Montgomery et al. U.S. Pat. No. 2,717,873 discloses a clarifier and digester having an open ended, and longitudinally slotted, short pipe extending into a tank at a region remote from the primary exit of liquid.

Steele U.S. Pat. No. 3,433,258 discloses a tank which may be used as a septic tank and is provided with a stub pipe outlet having an array of circumferentially spaced longitudinal slots. The pipe has a closed end containing a central aperture and the slot array extends around the periphery to form an outlet strainer rather than a scum remover over a broad expanse of the liquid surface in the tank.

While multi-stage sewage treatment arrangements are known, particularly for community and industrial systems, these systems generally include mechanisms having the mechanical pumps, scrapers, and scum removal systems of the type discussed above. Domestic septic systems are known with multi-compartmented septic tanks and even multiple tanks connected in series. However, the inhibiting of anaerobic digestion by the development of scum which inhibits the escape of gas from the liquid has been found to progress in such serially related tanks such that each tank develops a scum at a progressively lower rate if direct flow from its preceding tank is permitted. Ultimately, the scum is passed to all tanks with the anaerobic action deteriorating in the tank first to receive the waste fluids to a point that it essentially becomes a trap for solids and the intended initial breakdown of the sewage is then transferred to the next tank of the series. When permitted to continue, ultimately the anaerobic activity in all the tanks becomes blocked. German Pat. No. 1,036,771 of Aug. 14, 1958 shows a multi-compartmented septic tank of this general construction wherein a thick layer of scum has developed on the surfaces of the first compartment and, although the sewage passing to the second compartment is drawn from the lower portion of the first compartment, it, too, develops a scum layer. The German disclosure appears to contemplate a high density scum since it would appear that the gravity overflow exit to the following compartment of the series is located at the scum surface.

My previously-issued U.S. Pat. No. 4,154,685, which is incorporated by reference herein, addresses a number of the problems heretofore set forth, and the present invention disclosed and claimed herein consists of an improvement over the system set forth in said patent.

In accordance with the above, an object of the present invention is to improve scum removal over the upper surface of the liquid in a septic tank system.

A second object of this invention is to minimize the development of scum in the initial compartment or tank of a septic system to maintain anaerobic action in that tank by passing metered quantities of scum to a next compartment for breakdown. This removal of scum from the preceding section mitigates against the inhibiting build-up in the first section while maintaining levels in the succeeding section which can be broken down by anaerobic action.

Another object is to eliminate mechanical movement of the scum removal equipment and the attendant complexity and maintenance burdens of such equipment.

A further object is to enhance the anaerobic digestion of sewage by removal of scum and the avoidance of the build-up of scum layers in septic tanks.

It is another object of the present invention to provide a new and improved scum removal system of the above-described character which comprises an improvement over the system shown in my earlier U.S. Pat. No. 4,154,685.

It is still another object of the present invention to provide a new and improved system, as above described, which is intended to provide for installations wherein severe clay, high water and/or limestone conditions exist.

It is accordingly a feature of this invention to provide an improved sewage treatment system primarily for residential use, and employing only gravity flow of the effluent through the system.

Specifically, it is a feature of the invention to provide a novel sewage treatment system which is an improvement over that shown in my U.S. Pat. No. 4,154,685.

A further feature of the preferred embodiment of the invention is to provide a residential sewage system having a plurality of serially-connected septic tanks, with each successive tank having its outlet disposed at a lower level than the preceding tank so that transfer of effluent through the tanks occurs by gravitational action, and to provide novel transfer means between each of the successive tanks which concurrently affect the removal of substantially all of the scum or skin collecting on the surface of the respective tanks solely through the suction and/or entraining action of the effluent passing through the transfer means. Additional features of the invention described and claimed herein include means for installing a sewage system wherein severe high water, clay and/or limestone conditions exist.

Another feature of this invention is to provide an improved scum-removing transfer system for effecting the transfer of effluent from one serially-connected tank to the next, characterized by the utilization of at least one transfer pipe, having at least a portion of which is horizontally disposed, as the primary transfer conduit disposed at the desired fluid level in the respective tank and provided with a closed upstream end to avoid improper liquid flow paths to the exit of the tanks. The horizontal portion of each transfer pipe includes a wide, generally horizontal opening extending laterally from one side of the pipe to the other across a substantial upper portion thereof. Preferably, the opening is located at an elevation above a horizontal plane passing through the centerline of the pipe. The accumulated scum on the liquid surface of each tank is drawn through the opening and broken up, and then discharged from the tank through the action of the liquid passing through said opening. Such action mitigates against the build-up of scum which hinders the release of gas from the contents of the tank.

Optionally, the scum-removing transfer pipes may be disposed over a broad lateral extent of the tanks with the scum collection area more extensive in the tanks earlier in the treatment sequence to overcome the greater tendency to develop scum in the initial treatment tanks.

Another optional feature of this invention is a primarily domestic septic system for all soils which includes a series of four or more sections, all of which have the above-described scum removal means such that the scum build-up in each tank is held in a range such that anaerobic activity is maintained in each tank. It has been found that for normal home installations, four sections of a thousand gallon capacity each when interconnected by the scum-removing transfer pipes reduce the material exiting the fourth section to an essentially clear liquid, the clear liquid can safely be issued to a drain field or to a trench or other fluid-conveying means for disposal.

Organic material from disposals and lavatory and toilet waste can thus be disposed of in accordance with the present invention with no need for periodic cleaning of the tanks.

Further objects, advantages and features of the invention will become apparent from the following description and the appended claims, taken in conjunction with the accompanying drawings.

BRIEF DESCRIPTION OF THE DRAWINGS

FIG. 1 is a schematic plan view of a septic tank system, embodying the present invention.

FIG. 2 is a schematic vertical sectional view of the system of FIG. 1, taken generally at line 2—2, showing the arrangement of tanks and effluent scum-collecting transfer pipes utilized in the septic tank system of the present invention.

FIG. 3 is a large-scale fragmentary longitudinal sectional view of one of the transfer pipes of FIGS. 1 and 2 taken at line 3—3 of FIG. 1.

FIG. 4 is a large-scale cross-sectional view of one of the transfer pipes, as at line 4—4 of FIG. 3, employed in the septic tank system of FIGS. 1 and 2.

FIG. 5 is a schematic plan view of an alternate embodiment of the invention incorporating an apparatus for discharging the final filtrate in installations having impervious clay.

FIG. 6 is a schematic vertical sectional view of the alternate system of FIG. 5, taken generally at line 6—6 thereof.

DETAILED DESCRIPTION OF THE PREFERRED EMBODIMENTS

FIGS. 1 through 6 of the drawings and the following discussion illustrate and describe exemplary embodiments of the present invention as incorporated into a septic system having four serially-connected septic tanks or effluent receivers for purposes of illustration. One skilled in the art will readily recognize, however, that the principles of the invention are equally applicable to other effluent or fluid systems as well as to septic systems other than that shown in the drawings.

Referring now particularly to FIGS. 1 and 2, an inlet pipe 11 carrying raw sewage connects with the top of the interior of the first of the plurality of serially-connected septic tanks 10, 20, 30 and 40. Transfer pipe connections 12, 13 and 14 are provided between tanks 10 and 20, 20 and 30, and 30 and 40, respectively, and transfer pipe connection 15 is provided for discharge of the effluent from the septic system as described below.

The consecutive tank sections can all be disposed in the soil at the same vertical level, if desired. However, since the effluent flows through the septic tank system solely by gravity, it is necessary that the transfer connections 12, 13, 14 and 15 be at successively lower levels than at least the inlet pipe 11. Accordingly, if the tanks are disposed at the same vertical level, the effective fluid holding capacity of each successive tank is reduced if each tank has the same horizontal dimensions as is shown in the arrangement of FIG. 1. In contrast, where the successive tanks are optionally disposed at progressively lower levels than the preceding tanks, gravity flow of the effluent may be achieved without reducing the effective fluid holding capacity of each of the successive tanks.

Referring now particularly to FIGS. 3 and 4, each successive transfer connection 12, 13, 14 and 15 typically incorporates at least one generally horizontal transfer pipe section 16, formed from plastic or other corrosion resistant material. Each of the transfer pipe sections 16 includes a wide generally horizontal opening 21 which preferably extends longitudinally along a substantial portion, but less than all, of the length of the horizontal pipe section 16. The opening 21 is preferably disposed at an elevation at or above a horizontal plane passing through the centerline of the horizontal pipe section 16 and extends laterally from one side to the other across a substantial portion of the pipe section in a generally symmetrical relationship with a vertical plane passing through the centerline. Where the transfer pipe section is circular in cross-section, as shown in the exemplary embodiments of the drawings, the opening 21 preferably extends circumferentially across the upper portion of the pipe through a total arc of approximately 45° to approximately 180°. In one preferred construction, such arc is approximately 90°, such that the lower lateral edges 21a of the opening 21 are located on a horizontal plane approximately one and one-half inch below the top of a four-inch pipe.

Preferably, the opening 21 in each transfer pipe 16 is formed by cutting or otherwise removing a segment of the pipe wall from an upper portion of the pipe to form said opening as described above. Such removed segment of pipe wall may then optionally be secured to the bottom exterior of the transfer pipe, such as is illustrated at 29 in FIGS. 2 through 4, in order to provide structural reinforcement for the portion of the transfer pipe corresponding to the opening 21. A downwardly-extending pipe portion may then be provided on the discharge end of the horizontal pipe portion and the pipe is located in an upper portion of its tank to establish a predetermined liquid level therein.

Inherently, the level of the lower lateral edges 21a of the opening 21 in the transfer pipe 16 determines the effluent level in each successive tank. In accordance with the invention, the accumulated scum 18 on the surface of the liquid 19 of each tank is drawn through the opening 21, is broken up and discharged from the tank through the action of the liquid A. Such breaking up and discharging of the scum 18 mitigates against the build-up of a barrier of the scum 18 which hinder the release of gas from the contents of the tank.

The scum 18 is primarily composed of untreated or partially treated particles of solid sewage to which are adhered sufficient bubbles of carbon dioxide or methane gas to effectively float such particles to the top of the liquid 19. Such particles are drawn into the interior of the transfer pipe 16 through the suction action of the liquid passing by gravity flow through the openings 21 to the next tank, and in the course of such transfer, much of the gases are dislodged from the particles so when the particles enter the next-successive tank they tend to settle in the lower portion of the tank and are subject to the full bacterial action of the next tank.

To facilitate the transfer of the scum 18 to the lower portion of the next-successive tank, each generally horizontal transfer pipe section 16 preferably includes a generally downwardly-extending portion on its discharge end, such as the downwardly-extending portions 41a, 41b and 41c, shown in FIG. 2 in tanks 20, 30 and 40, respectively. The downwardly-extending portions 41a, 41b and 41c are open at their lower ends and preferably terminate at successively lower levels in order to facilitate gravity flow of the liquid 19 and the scum 18 to the next successive tank.

In FIG. 4, the flow of the liquid 19 and the scum 18 into the opening 21 in each pipe 16 is illustrated whereby the scum thickness is diminished in the vicinity of the transfer pipe 16 by withdrawal of that material, particularly in the interface region. Arrows "S" represent this withdrawal along with the liquid 19 over the lateral edges 21a similar to the flow of a liquid over a weir structure. The relatively limited depth of scum and liquid at the bottom 25 of transfer pipe 16 are in a state to result in a release of gas which is easily passed through the thin scum layer as it is broken down. The gas generated by action in the pipe 16 along with the gas from succeeding stages of the system escapes to the air space 23 above the liquid and scum in each tank.

In tank 20, scum enters by means of gravity flow or hydraulic power, as described above, and is discharged through downwardly-extending portion 41a. Much of the scum is then subject to bacteriological action in the tank 20 and converted into relatively harmless soluable materials, gases, and sludge. In tank 30, the remaining scum 18 has diminished greatly and is largely eliminated before it exits at transfer connection 14. In tank 40, at least one additional transfer pipe 16 is provided to assure that all the scum is removed by the time it reaches transfer connection 15 to be discharged as clear effluent.

It is theorized that the distributed removal of scum not only maintains the scum layer thin over a major portion of the liquid surface 24 but also unbalances the scum molecular surface tension, particularly in the transfer pipes, to enhance the release of the toxic gases generated. The scum in the transfer pipes and succeeding sections releases its supporting gas and falls to the bottom as sludge where the anaerobic bacteria and natural process of breakdown continues, perhaps with the regeneration of scum which surfaces but is accommodated without detriment to the system by the repetition of the scum removal process, although to a lesser degree in each succeeding section.

In each case, the horizontal transfer pipes 16 may be supported within their respective tanks in any suitable fashion, such as is shown for example in my previous U.S. Pat. No. 4,154,685, mentioned above.

Septic tank systems incorporating this invention may have any number of tanks, but normally should embody at least four successive tanks in order to assure adequate sewage treatment. The important aspect of this invention is the provision for the automatic removal of scum accumulating in the tanks in the system, solely by the gravity flow of effluent through the system.

With septic tank systems embodying this invention, the effective working life of the system is now limited only by the accumulation of sludge in the bottom of the tanks and, of course, more sludge generally accumulates in the bottom of the first tank than in any of the subsequent tanks. With the maintenance of a high level of anaerobic activity, however, sludge is reduced beyond that previously achieved in systems having no mechanical sludge removal equipment.

It is to be noted that instead of trucking a plurality of individual tanks to an installation, the tanks may optionally be fabricated on site in a unitized assembly consisting of multiple cells to minimize transportation expenses, as will be appreciated by those skilled in the art.

In summary, the preferred form of the present invention involves a multiple tank septic system operating without moveable parts which has enhanced self-cleaning capabilities and enhanced effluent purification. The system utilizes gravity flow in a serial connection of elements through the tanks and is accomplished without mechanical drive means. The improved function of the system is attributed to improved scum removal at the scum-liquid interface region to prevent the build-up of a barrier of scum which would prevent gas release from the contents of the tank. Horizontal transfer pipes, extending essentially across the liquid surface at the surface level, are provided with the above-discussed openings to draw down and break up the scum before conveying it and the liquid to the succeeding effluent receiver.

In accordance with the principles of the present invention, certain variations may be made to the above-described system to accommodate for conditions such as high clay, limestone or high water conditions which normally have a tendency to inhibit satisfactory percolation. In particular, FIGS. 5 and 6 illustrate the addition of a pump 44 in a partitioned-off portion of the final tank and a piping system 62 for carrying the final filtrate through a trench 63 or other fluid-conveying means to a storm sewer, mound, or other disposal site.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A septic system having stationary elements, said septic system comprising:

a number of serially-connected septic tank structures, each defining an enclosed chamber adapted to serve as an effluent receiver, a stationary inlet pipe communicating with the top portions of the first tank to transmit raw sewage thereto and a stationary outlet pipe in the last of said serially-connected tanks located at a significantly lower level than said inlet pipe to discharge treated effluent from said last of said serially-connected tanks;

a plurality of stationary transfer connections respectively connecting each preceding serially-connected tank to its next succeeding serially-connected tank and connecting the last of said serially-connected tanks to said outlet pipe;

each of said transfer connections including at least one stationary generally horizontally transfer pipe having a generally circular cross-section and being fixedly disposed generally at the upper level of the resepctive serially-connected tank but below the normal liquid level of the preceding serially-connected tank, said transfer pipe being of a plastic composition and extending generally horizontally into the next succeeding serially-connected tank each of said transfer connections including a generally downwardly-extending pipe portion on the discharge end of said generally horizontal plastic pipe portion, said downwardly-extending pipe portion being in fluid communication with said generally horizontal plastic pipe portion and having an open lower end, said open lower ends being located at successively lower levels in each of said serially-connected tanks to facilitate gravity flow from tank to tank;

the horizontal portion of each of said plastic transfer pipes having a wide generally horizontal opening therein, said opening extending laterally from one side of said plastic transfer pipe to the other throughout an arc of approximately 45 degrees to approximately 180 degrees at an elevation above a horizontal plane passing through the centerline of said plastic transfer pipe and extending longitudinally along a substantial portion, but less than all, of the length of said horizontal portion of said plastic transfer pipe, said generally horizontal opening being generally symmetrical about a vertical plane passing through the centerline of the horizontal portion of said plastic transfer pipe, said generally horizontal opening in said plastic transfer pipe being formed by removing an arcuate upper segment of the horizontal portion of said plastic transfer pipe, said removed arcuate upper segment being secured to a generally opposite lower surface of said horizontal portion of said plastic transfer pipe to provide structural reinforcement for the portion of said plastic transfer pipe from which said arcuate upper segment has been removed;

whereby accummulated scum on the liquid surface of each tank may be drawn through said generally horizontal opening, broken up, and discharged into the next succeeding serially-connected tank through the action of the liquid passing by gravity through said generally horizontal opening in the respective transfer pipe in order to mitigate against the build-up of a barrier of scum which would hinder the release of gas from the contents of said tank.

* * * * *